(12) United States Patent
Shah et al.

(10) Patent No.: US 9,228,029 B2
(45) Date of Patent: Jan. 5, 2016

(54) CATALYST SUPPORTS, CATALYSTS AND THEIR MANUFACTURE AND USE

(75) Inventors: Parag Rasiklal Shah, Lafayette Hill, PA (US); Yatao Rachel Hu, Malvern, PA (US); Myoung Kie Lee, King of Prussia, PA (US)

(73) Assignee: PQ CORPORATION, Malvern, PA (US)

( * ) Notice: Subject to any disclaimer, the term of this patent is extended or adjusted under 35 U.S.C. 154(b) by 146 days.

(21) Appl. No.: 13/805,512

(22) PCT Filed: Jun. 23, 2011

(86) PCT No.: PCT/GB2011/000943
§ 371 (c)(1),
(2), (4) Date: Dec. 19, 2012

(87) PCT Pub. No.: WO2011/161412
PCT Pub. Date: Dec. 29, 2011

(65) Prior Publication Data
US 2013/0090437 A1     Apr. 11, 2013

Related U.S. Application Data

(60) Provisional application No. 61/358,125, filed on Jun. 24, 2010.

(30) Foreign Application Priority Data

Jun. 24, 2010  (EP) .................................... 10251143

(51) Int. Cl.
| | | |
|---|---|---|
| *C08F 4/02* | (2006.01) |
| *B01J 21/08* | (2006.01) |
| *B01J 23/26* | (2006.01) |
| *B01J 35/10* | (2006.01) |
| *B01J 37/03* | (2006.01) |
| *B01J 37/06* | (2006.01) |
| *C08F 10/00* | (2006.01) |

(52) U.S. Cl.
CPC . *C08F 4/02* (2013.01); *B01J 21/08* (2013.01); *B01J 23/26* (2013.01); *B01J 35/1023* (2013.01); *B01J 35/1047* (2013.01); *B01J 37/036* (2013.01); *B01J 37/06* (2013.01); *C08F 10/00* (2013.01)

(58) Field of Classification Search
CPC ........................................................ C08F 4/02
USPC ................................... 526/106; 502/256, 439
See application file for complete search history.

(56) References Cited

U.S. PATENT DOCUMENTS

| | | | |
|---|---|---|---|
| 3,652,214 A * | 3/1972 | Aboutboul et al. ........... 423/338 |
| 3,652,216 A * | 3/1972 | Krekeler et al. .............. 423/338 |
| 3,959,174 A | 5/1976 | Winyall et al. |
| 4,193,851 A | 3/1980 | Crawford et al. |
| 4,230,679 A | 10/1980 | Mahler et al. |
| 4,339,559 A | 7/1982 | McDaniel |
| 5,229,096 A | 7/1993 | Cohen |
| 5,376,348 A | 12/1994 | Stoilov et al. |
| 7,019,089 B2 | 3/2006 | Schneider et al. |
| 7,470,725 B2 | 12/2008 | Schwertfeger et al. |
| 2004/0014914 A1 | 1/2004 | Schneider et al. |

FOREIGN PATENT DOCUMENTS

| | | |
|---|---|---|
| EP | 0 013 122 A2 * | 7/1980 |
| EP | 0013122 | 7/1980 |
| EP | 1059267 A1 | 12/2000 |
| GB | 2131406 A | 6/1984 |
| GB | 2269377 A | 2/1994 |
| JP | 55-116615 | 9/1980 |
| JP | 2003192713 | 7/2003 |
| JP | 2004502795 | 1/2004 |
| WO | 9845035 A1 | 10/1998 |

OTHER PUBLICATIONS

European Search Report for EP 10 25 1143 dated Nov. 29, 2010.
Bhagat, et al., "Superhydrophobic Silica Aerogel Powders with Simultaneous Surface Modification, Solvent Exchange and Sodium Ion Removal From Hydrogels" ScienceDirect, Microporous and Mesoporous Materials, 112, (2008) pp. 504-509.
Yongqing, et al., "Ultrafine Si02 Aerogel Prepared by the Sol-gel Method—Effect of Preparation Parameters on Testure Properties of Aerogels," Chinese Academy Sciences Taiyuan, (1996) (English Abstract attached).
Ru, et al., "Analysis of the Effect of Drying Conditions on the Structural and Surface Heterogeneity of Silica Aerogels and Xerogel by Using Cryogenic Nitrogen Adsorption Characterization" Microporous and Mesoporous Materials, 129 (2010) pp. 1-10.
Sarawade, et al., "High Specific Surface Area TEOS-based Aerogels With Large Pore Volume Prepared at an Ambient Pressure" ScienceDirect, Applied Surface Science, 254, (2007) pp. 574-579.
Sheinfain, et al., "Methods of Preparing Silica Gels With a Fixed Pore Structure" L.V. Pisarzhevskii Institute of Physical Chemistry, Academy of Sciences of the USSR. Translated from Kinetika L. Kataliz, vol. 8, No. 2, pp. 433-440, Mar.-Apr. 1967. Original article submitted Sep. 11, 1965.
English Translation of Office Action Issued in JP Patent Application No. 2013-515956 dated Jun. 16, 2015.

* cited by examiner

*Primary Examiner* — Robert Harlan
(74) *Attorney, Agent, or Firm* — Buchanan Ingersoll & Rooney PC (57) ABSTRACT

A process for preparation of silica xerogel catalyst support particles having high surface areas involves ageing a silica hydrogel at a pH from 3 to 5 and at a temperature of 45° C. or more. The ageing at low pH leads to a silica gel which may be converted to a xerogel having a pore volume of 1.5 cm³/g or more and a surface area of 600 m²/g or more by removal of liquid from the pore structure by solvent exchange with a liquid solvent having a surface tension of 35 mN/m or less. The resulting particles are useful for carrying catalyst metal compounds, such as a chromium compounds, in the pore structure to act as catalyst precursors. These catalyst precursors may be activated into porous catalyst particles suitable for use for olefin polymerization to provide high activity and for forming high molecular weight polymers (low MI polymers) with good crack resistance.

20 Claims, 1 Drawing Sheet

CATALYST SUPPORTS, CATALYSTS AND THEIR MANUFACTURE AND USE

CROSS-REFERENCE TO RELATED APPLICATIONS

This application is the United States national phase under 35 U.S.C. §371 of PCT International Application No. PCT/GB2011/000943, filed on Jun. 23, 2011, claiming priority to U.S. Provisional Application No. 61/358,125 and European Patent Application No. 10251143.3 both filed on Jun. 24, 2010. Both of those applications are incorporated by reference herein.

FIELD

The invention relates to processes for the formation of porous solid particles for use as catalyst support particles, particularly porous silica xerogel particles. These are suitable for use in carrying catalyst compounds, such as chromium compounds, as catalyst precursors which may be activated for use in polymerisation reactions, such as polymerisation of olefins. The invention additionally relates to the catalyst support particles, catalyst precursors and activated catalysts prepared from the support particles, and their use in the polymerisation of olefins (α-alkenes).

BACKGROUND

Typical Phillips-type activated catalysts for use in the polymerisation of olefins comprise chromium oxide carried on surfaces within the pore structure of porous inorganic support particles. For many uses, aluminium oxide, titanium oxide, or other oxides may also be present, either as part of the inorganic support itself (for instance where the support is a silica-alumina co-gel support), or also carried, along with the chromium oxide, within the pore structure of the porous inorganic support.

Typically, catalyst compounds are impregnated, in liquid form, into the pore structure of porous support particles. For instance, the catalyst compound may be impregnated into the pore structure as an organometallic compound, for instance dispersed or dissolved in a solvent. Solvent removal may be carried out by evaporation prior to activation of the catalyst compound. The impregnated support particles (i.e. inorganic porous support particles impregnated with catalysts compounds) are referred to as catalyst precursor particles and subsequently may require activation in order to make them useful as catalyst particles, for instance for olefin polymerisation.

Generally, the carrier particles, after impregnation with the catalyst compound, are supplied and transported in unactivated form (i.e. as catalyst precursor particles), and may require activation prior to being useful as catalyst particles for olefin polymerization. Activation is carried out by heating the catalyst precursor particles at a high temperature, such as from 200° C. to 1200° C., preferably from 400° C. to 1000° C. for a time, from a few seconds, but typically up to several hours, for instance from 30 minutes to 15 hours, in a non-reducing atmosphere such as nitrogen, inert gas or carbon dioxide, or preferably in an oxidising atmosphere such as air or oxygen, so that the catalyst is converted into an active state. For instance chromium is suitably converted to a chromium VI state by oxidation. Once activated, the catalyst may be used at once, or stored in a dry, inert atmosphere until it is used.

It is desirable for the support particles to have a pore structure with a high pore volume. For instance, a pore volume of 1.5 $cm^3/g$ or more is desirable. It is also desirable for the carrier particles to exhibit a high surface area, for instance 600 $m^2/g$ or more.

Mean pore diameter for the pore structure of a support particle is proportional to pore volume and inversely proportional to pore surface area. Hence, it is possible in principle for two carrier particles to have the same mean pore diameter, but with the first support particle having low pore volume and low surface area, and the second support particle having high pore volume and high surface area. It is desirable that the pore diameter for the pores making up the pore structure should be large in order to obtain an active catalyst (there is a minimum pore diameter requirement for the catalyst to be active according to prior art literature). Polymerisation processes may be targeted to produce polymer of a certain selected molecular weight. This is usually assessed by the Melt Index (MI) of the polymer, with the MI having an inverse relationship with molecular weight (high MI indicating low molecular weight, and vice versa). For a fixed MI target and a fixed catalyst pore diameter, higher pore volume is associated with higher surface area, higher activity and also with improvements in Environmental Stress Crack Resistance (ESCR) for instance as measured by NCTL (Notched Constant Tensile Loading) behaviour for the polymer generated by polymerisation using the support particles. Catalyst activity is a parameter indicating the weight of polymer generated per weight of catalyst used per hour, so a high value is desirable for reasons of efficiency.

If two catalyst particles having the same pore volumes, but differing pore diameters, and hence differing surface areas, are compared: the catalyst particle with the higher surface area will have a lower pore diameter, and for the same activation and polymerisation reactor conditions, will yield a lower MI polymer than the catalyst particle with a lower surface area. The pore volume and surface area for a catalyst are closely related to the corresponding values for the support particle used to make it (for instance, depending upon treatment conditions, the surface area may be up to say 150 $m^2/g$ lower than that of the corresponding support particle and pore volume may be reduced by up to say 0.8 $cm^3/g$ compared to the pore volume for the support particle). In other words, the provision of a support particle with a fixed pore volume and a higher surface area for its pore structure allows for the polymerisation of olefins to yield low MI polymers (high molecular weight polymers) at high activity and with good NCTL/ESCR behaviour for the resulting polymer.

High load melt index (HLMI) and melt index (MI) are polymer characteristics determined in accordance with ASTM D-1238 using loads of 21.6 kg and 2.16 kg respectively at 190° C.

In conventional manufacturing processes for preparation of carrier particles based on silica, a silica hydrogel is prepared and then water removed from the hydrogel to yield a dried gel or xerogel having a pore structure left by the removed water. For instance, a reaction between an alkali metal silicate, such as sodium silicate, and an acid may be carried out to form a hydrosol, followed by gelation of the hydrosol to yield a hydrogel. Typically, the hydrogels for use as catalyst support particles are aged at a temperature of 40° C. or more for several hours or more, and at a pH typically greater than 7. This ageing step has been considered necessary in the prior art in order to sufficiently strengthen the resultant silica hydrogel so that subsequent removal of the water from the hydrogel, to provide the pore structure, does not lead to the silica skeleton of the particles collapsing during water removal and yielding a low pore volume. However, this ageing process, when used to obtain a final pore volume of 1.5 cm$^3$/g or more, leads to an accompanying reduction in surface area to values less than 600 m$^2$/g.

The theoretically attainable pore volume will be determined by the solids content of the final hydrogel after washing, with water filling the pore structure, and hence the solids content of the hydrosol from which the hydrogel is formed.

In this specification, the term "solids content" as applied to hydrogel refers to the weight percentage of insoluble oxide solids in the washed hydrogel, i.e. with soluble salts substantially removed from the pore structure. For a silica hydrogel with a skeleton consisting of silica only, this will correspond to the silica content, but when other insoluble oxides such as titania or alumina are also present within the skeletal molecular structure of the silica, the total amount of insoluble oxide should be taken into account.

The theoretical maximum pore volume attainable will be determined by the volume of insoluble solids in the sol/gel. Were the solids to form a completely rigid skeletal network which did not collapse when liquid was removed from the gel, then all of the volume vacated by liquid would remain as pore volume for the resulting catalyst support particles. Typically, the theoretical maximum pore volume (TPV in cm$^3$/g) is estimated by $(100-\% SiO_2)/\%/SiO_2$, for a silica gel, where % $SiO_2$ is the percentage by weight of $SiO_2$ in the washed silica hydrogel (i.e. with substantially no soluble salts in the pore structure of the hydrogel).

Without wishing to be bound by any theory, it is thought that the removal of water from the pore structure of a silica gel leads to forces, arising from the surface tension of the water, collapsing the pore structure at least in part as the water is removed. This effect may be reduced by solvent exchange methods, where the water within the filled hydrogel is first partially or entirely replaced by a solvent having a lower surface tension than water (such as an aliphatic alcohol, e.g. methanol or ethanol, or for instance propan-2-ol, trifluoroacetic acid or acetone). Solvent exchange methods are well known in the field and include azeotropic distillation and multiple solvent exchange processes where a first solvent exchange is carried out with a water-miscible first solvent and a subsequent exchange with a water-immiscible second solvent that is miscible with the first solvent. Although such solvent exchange processes may reduce loss in pore volume resulting from drying the hydrogel (for instance by first exchanging solvent for water and then removal of the exchanged solvent) it may not eliminate pore volume loss completely, and so strengthening of the porous silica structure is still important if pore volume is to be maintained when water is removed from the pore structure of the hydrogel. Solvent exchange processes, when used to obtain a final pore volume in excess of 1.5 cm$^3$/g, still require ageing of the hydrogel prior to water removal which typically leads to an accompanying reduction in surface area to values less than 600 m$^2$/g.

It is desirable for catalyst support particles to be sufficiently friable that the particles break down during olefin polymerisation processes in order to avoid a gritty texture in the resulting polyolefin. The fragments of catalyst particles are typically allowed to remain in the resulting polyolefins and so it is important that they break down into tiny particles which are dispersed throughout the polyolefin. However, catalyst support particles which are too friable may be unable to withstand the processing steps used to deposit catalyst metal into the pore structure and to form activated catalyst particle.

Ageing at pH greater than 7 has typically been the conventional method used to achieve an adequately large pore diameter for xerogel catalyst support particles. Ageing is thought to result from a strengthening of the silica matrix or skeleton to resist collapse, and it is thought that the strengthening arises from Ostwald ripening of the silica particles, so conventionally, conditions are selected (i.e. pH greater than 7) so that the silica is relatively soluble in order that such ripening may occur within reasonable times. In practice, it has been found that the increased pore volume arising from such strengthening has to be traded off against an accompanying reduction in surface area. This typically results in surface area values less than 600 m$^2$/g for the catalyst support particles having pore volumes of 1.5 cm$^3$/g or more and prepared by solvent exchange of hydrogel aged at pH 7 or more.

Attempts to overcome these problems in the prior art have included the use of a supercritical fluid, such as organic solvent or carbon dioxide, for replacement of water in the hydrogel. The principle underlying the use of supercritical solvent is that the surface tension vanishes for a solvent in a supercritical state and so strengthening by ageing at pH greater than 7 may be obviated. Silica gels with a surface area of 1195 m$^2$/g and with a pore volume of 3.53 cm$^3$/g were achieved by use of supercritical fluid as an exchange medium. See Ranliao Huaxue Xuebao 1996-24(6) 517 to 521. See also Yang Ru et al, Microporous and Mesoporous Materials, 129(2010) 1 to 10. However, the use of supercritical fluids typically requires high pressure containment vessels and is a highly complex process for safe operation on an industrial scale. Furthermore, the resulting xerogels may be weaker than conventionally strengthened xerogels.

Alternatively, the surface of the silica may be treated with a silylating agent prior to formation of a xerogel. This is described for instance in U.S. Pat. No. 7,470,725 and in Microporous and Mesoporous Materials (2008) 112 (1-3), 504 to 509 or Applied Surface Science (2007), 254(2) 574 to 579. The use of a silylating agent leads to the majority of the silica carrier's surface hydroxyl groups being eliminated due to reaction with the silylating agent. Hence the dried gels typically have a high carbon content. For example, the silica carrier prepared according to U.S. Pat. No. 7,470,725 may contain as much as 12% by weight of carbon in the dried state. For many catalytic applications, the surface hydroxyl groups of the silica may have an important role to play in anchoring catalytically active species, and so their chemical inactivation by silylating agents is undesirable.

Another route which has proved effective, for giving support particles with high surface areas and high pore volumes, is freeze-drying of hydrogels. This involves freezing at a temperature sufficiently low for the water in the hydrogel pores to be maintained in a solid state, followed by vacuum sublimation of water from the hydrogel. This is disclosed, for instance, in U.S. Pat. No. 3,652,214 in which the resulting silica carrier has a surface area of 757 m$^2$/g and a pore volume of 2.77 cm$^3$/g. The freeze drying process is a slow and energy intensive process compared to solvent-exchange based formation of xerogel catalyst support particles.

Another prior art route requires the presence of a small quantity of polymerisation modifier to be present in the solution/sol from which the hydrogel is formed. This method, disclosed in U.S. Pat. No. 5,229,096 provided a silica carrier, after washing, with a surface area of 995 m$^2$/g and a pore volume of 2.32 cm$^3$/g. The polymerisation modifier may remain as an impurity in the carrier and could have a negative effect on catalyst performance if not entirely removed from the catalyst support particles.

Hence, there is a need for a process for preparation of porous xerogel catalyst support particles which have both a high surface area and a high pore volume for the pore structure. The method should also be suitable for being carried out using current processing equipment and not require the introduction of potential catalyst contaminants into the xerogel during its preparation. There is also a need for a process for preparation of such porous xerogel catalyst support particles so that the particles have suitable strength to provide resistance to transport and handling but sufficient friability to break down during use in polymerisation reactions.

SUMMARY OF THE INVENTION

It is one object of the invention, amongst others, to provide porous xerogel catalyst support particles having high surface area in combination with high pore volume. Another object is to provide a process for preparation of such support particles using conventional apparatus and solvent-exchange techniques. It is another object of the invention to avoid the need to use supercritical solvents for xerogel formation. It is also an object of the invention to avoid the incorporation of additives into the xerogel which may interfere with catalyst activity or which may require additional process steps for their removal.

A first aspect of the invention provides process for preparation of catalyst support particles having a pore structure with a pore volume of 1.5 cm$^3$/g or more and a surface area of 600 m$^2$/g or more, the process comprising:

a) providing a silica hydrogel having a solids content from 15% to 33% by weight by acidification of an alkali metal silicate, b) forming the silica hydrogel into hydrogel particles, c) washing the hydrogel particles for a period of 1 hour or longer, at a pH of 3.5 or less to substantially remove salt, d) contacting the hydrogel particles with an aqueous ageing solution, arranged to provide an aqueous dispersion having a pH from 3 to 5, and at an ageing temperature from 40° C. up to the boiling point of the solution, for an ageing period of 4 hours or longer, to provide aged hydrogel particles, e) carrying out solvent exchange on the aged hydrogel particles with a liquid solvent having a surface tension of 35 mN/m or less whereby the aqueous solution in the aged hydrogel particles is substantially replaced by the liquid solvent, and f) substantially removing the liquid solvent from the aged hydrogel particles to provide the catalyst support particles.

A second aspect of the invention provides a catalyst support particle obtained by the method of the first aspect of the invention. Hence the second aspect of the invention provides a catalyst support particle which is a silica xerogel comprising at least 90% by weight of silica, having a pore volume of 1.5 cm$^3$/g or more and a surface area of 600 m$^2$/g or more, wherein the catalyst support particle provides a pH of 6 or less when measured at 25° C. in a slurry of boiled, demineralised water with 12.5 g of catalyst support per 100 ml of slurry. The catalyst support particle of the second aspect of the invention may have a soda (i.e. Na$_2$O) content from 20 to 1000 ppm (parts per million) by weight, for instance from 60 to 600 ppm by weight.

A third aspect of the invention provides a catalyst precursor comprising a catalyst support particle according to the second aspect of the invention comprising a compound of a catalyst metal deposited within the pore structure, preferably wherein the catalyst metal comprises chromium.

A fourth aspect of the invention provides an olefin polymerisation catalyst obtained or obtainable by heating a catalyst precursor according to the third aspect of the invention in a non-reducing atmosphere, preferably an oxidizing atmosphere, at a temperature from 200 to 1200° C. for an activation period from 30 minutes to 15 hours.

A fifth aspect of the invention provides a method for polymerisation of one or more C$_2$ to C$_8$ α-alkenes characterized in that the polymerisation is carried out in the presence of an olefin polymerisation catalyst according to the fourth aspect of the invention.

A sixth aspect of the invention provides the use of an olefin polymerisation catalyst according to the fourth aspect of the invention for polymerisation of one or more C$_2$ to C$_8$ α-alkenes to generate low melt index polymers.

DETAILED DESCRIPTION OF THE INVENTION

Throughout this specification, the term "comprising" or "comprises" means including the component(s) specified but not to the exclusion of the presence of others. The term "consisting essentially of" or "consists essentially of" means including the components specified but excluding other components except for materials present as impurities, unavoidable materials present as a result of processes used to provide the components, and components added for a purpose other than achieving the technical effect of the invention. Typically, a composition consisting essentially of a set of components will comprise less than 5% by weight, typically less than 3% by weight, more typically less than 1% by weight of non-specified components.

Whenever appropriate, the use of the term "comprises" or "comprising" may also be taken to include the meaning "consists essentially of" or "consisting essentially of".

The first aspect of the invention provides a process for preparation of catalyst support particles having a pore structure with a pore volume of 1.5 cm$^3$/g or more and a surface area of 600 m$^2$/g or more.

In step a) a silica hydrogel is provided, having a solids content from 15% to 33% by weight, preferably from 20% to 30% by weight, by acidification of an alkali metal silicate solution, such as potassium or sodium silicate, usually sodium silicate. The solids content is defined in this specification as the weight percent of insoluble oxide in the hydrogel based upon the weight of the washed hydrogel particles (i.e. with the pore structure of the particles filled with water and with soluble salts that are the by-products of the hydrogel formation substantially washed out of the particles). For the measurement of solids content, the soluble salts are substantially removed from the hydrogel by washing so that the hydrogel contains less than 2000 ppm by weight of alkali metal oxide (e.g. Na$_2$O), preferably less than 1000 ppm by weight of the hydrogel. Typically this can be achieved by washing with a pH 3 aqueous solution for 5 hours.

Process step a) will typically involve the formation of a hydrosol by addition of an excess of strong acid to an alkali metal silicate solution such as sodium silicate solution, for instance at a temperature of from 30 to 60° C., such as 55° C., with subsequent gelation of the hydrosol to yield a hydrogel having the required solids content. It will typically take about 3 to 20 minutes, say 4 to 10 minutes for the sol to solidify into a gel, and the gel is then typically allowed to consolidate for a further 40 to 150 minutes prior to further processing steps being undertaken. The acid is typically added so that the resulting sol has a normality of 0.5 to 1 (i.e. the sol is 0.5 to 1 N acid). Any suitable mineral acid may be used, for instance sulphuric acid, nitric acid or hydrochloric acid. Sulphuric acid is preferred. The pH during gel formation will typically be less than 3. However, if the resulting gel has a pH greater than 3, the gel pH is suitably reduced to 3 or less by acidification prior to further processing in order to avoid inadvertent loss of surface area prior to washing.

In one suitable arrangement, the initial alkali metal silicate solution may typically have a $SiO_2$ content by weight from 13 to 40% by weight with a $SiO_2:M_2O$ molar ratio from 0.9 to 3.7, typically from 2.0 to 3.3, where M represents an alkali metal such as K or Na. The acid used for forming the hydrosol may, for instance, be sulphuric acid, added typically under high shear conditions in blending or mixing apparatus. The molar ratio of $H_2SO_4:M_2O$ will typically be greater than 1, for instance from 1.2 to 2, for instance about 1.4.

The hydrosol as initially formed may typically have a $SiO_2\%$ content by weight from 12% to 19%: the $SiO_2\%$ of the resulting gel is generally higher than that of the sol from which it was formed, with some liquid being lost due to syneresis and removal of soluble salt during subsequent washing. This arrangement may be referred to as an acid-set hydrogel.

In another suitable arrangement according to the invention, the initial alkali metal silicate solution may have a $SiO_2$ content by weight from 10 to 13% and molar ratio of $H_2SO_4$: $M_2O$ may be from 0.7-0.95. The resulting washed hydrogel typically resulting from such a process may have from 15 to 18% by weight of $SiO_2$. The hydrogel resulting from this process would have a pH typically of 10 or more prior to washing. The arrangement may be referred to as a base-set hydrogel. Because of this high pH, the gel pH is suitably reduced to 3 or less by acidification prior to further processing in order to avoid inadvertent loss of surface area prior to washing.

The later process step d) will inevitably lead to a loss in surface area for the gel as the gel is aged in the presence of the aqueous liquid in an aqueous dispersion having a pH from 3 to 5. The starting surface area for the gel entering step d) of the process of the invention will suitably be greater than 600 $m^2/g$ in order that the surface area of the final catalyst support particles may be 600 $m^2/g$ or more. When a silica gel is formed from silicic acid generated by adding a strong acid to an alkali metal silicate such as sodium silicate, the initial silica nanoparticles which coalesce to form the gel will have a size from 1 to 2 nm because they are formed at low pH. The silica nanoparticles may subsequently grow as the gel is formed and washed. The size of the silica particles from which the gel is formed, will limit the maximum surface area potentially obtainable for the final catalyst support particles. Hence, it is desirable, in order to ensure high final surface area, to form the silica gel under high agitation and with a pH of 3 or less, preferably 2 or less and to maintain a pH of less than 3 until the commencement of step d). This initial surface area may easily be assessed by drying out the hydrogel resulting from process step c) (i.e. a washed hydrogel), for instance by heating in a vacuum oven at 150° C., and subsequently measuring the surface area of the resulting dried gel.

Although the drying process may lead to a low pore volume, the surface area should be substantially unaffected by the drying method used. The hydrogel used at the start of process step d) should have a surface area of 620 $m^2/g$ or more, preferably 720 $m^2/g$ or more, more preferably 820 $m^2/g$ or more, even more preferably 920 $m^2/g$ or more, such as 950 or more, such as 1000 $m^2/g$ or more, say up to 1100 $m^2/g$, measured on the washed hydrogel after it has been dried.

The pore volume for the hydrogel used at the start of process step (d) will typically be less than 1.5 $cm^3/g$, such as 1.3 $cm^3/g$ or less, for instance 1.2 $cm^3/g$ or less, say 1 $cm^3/g$ or less. The pore volume may be measured after carrying out solvent exchange using methanol as the exchange solvent and evaporating the methanol under vacuum, followed by pore volume measurement as set out herein.

The silica hydrogel is formed in step b) into hydrogel particles. These will suitably be 2 cm or less in diameter (as measured by sieving). Formation into particles may be by comminution of the set gel by any suitable means such as, for instance by crushing using a mill or the like. This allows any further chemical processing to take place within reasonable time scales: if the hydrogel particles are too large then diffusion of chemicals into and out of the hydrogel particles may take excessively long times. Alternatively, the sol may be spray-set in order to form it into spheroidal gel particles of a suitable size. Spray-setting is particularly useful for base-set hydrogels as set out hereinbefore.

After gelation and forming into particles, the silica hydrogel is washed in step c), in order to remove the excess acid and to substantially remove water-soluble salts present following gelation. Water-soluble salt will typically be present as a by-product of the reaction between the silicate solution and the mineral acid used to form the hydrosol and hydrogel. By water-soluble is meant having a solubility in water of at least 10 g/liter at 25° C.

The gel particles are washed for a period of 1 hour or longer, such as from 1 to 24 hours, say 2 to 12 hours using an acidified wash liquor so that the pH of the gel during washing is typically 3.5 or less, preferably 3 or less. The acidified wash liquor may be water acidified to a low pH with sulphuric acid, or another mineral acid such as nitric or hydrochloric acid, for instance. The acidified wash liquor may have pH from 2.5 to 3.5 such as 3 to 3.5. Typically the washing step c) will be carried out at say from 15 to 40° C. This is beneficial for the removal of soluble salts resulting from the sol/gel reaction. By substantial removal of water-soluble salts is meant that the hydrogel is washed to provide an alkali metal oxide (e.g. $Na_2O$) content, expressed as weight percent of hydrogel, of less then 2000 ppm, preferably less than 1000 ppm. The wash liquor used in this step may consist essentially of water and mineral acid. Typically, from 5 to 50 liters of acidified wash liquor will be required per kg of hydrogel in order to substantially remove water-soluble salts.

The washing step c) to substantially remove water-soluble steps may take place before the ageing in step d) or after the ageing in step d). As set out hereinafter, steps c) and d) may also be concurrent.

Step d) of the process of the first aspect of the invention involves contacting the hydrogel particles with an aqueous ageing solution, arranged to provide an aqueous dispersion having a pH from 3 to 5, and at an ageing temperature from 40° C. up to the boiling point of the solution, such as 45° to 100° C., for an ageing period of 4 hours or longer, to provide aged hydrogel particles.

The ageing temperature is preferably from about 60° C. to the boiling point when the ageing is carried out at pH3 and from about 40° C. to 71° C., preferably about 45° C. to about 70° C., when the ageing is carried out at pH5. In other words, the lowest and highest suitable ageing temperatures are related to the pH as follows for a typical ageing time of about 20 hours:

$T_L$=lowest suitable ageing temperature=$(90-10 \times pH)$° C. Hence, at $pH$=3, $T_L$ is 60° C. and at $pH$5, $T_L$ is 40° C.

$T_H$=highest suitable ageing temperature=$(184-22.6 \times pH)$° C. Hence, at $pH$=3, $T_H$ is 116° C. and at $pH$5, $T_H$ is 71° C.

At pH 4 for the ageing temperature, for instance, the lowest suitable ageing temperature would be 50° C. and the highest suitable ageing temperature would be 93.6° C.

The highest suitable ageing temperature is determined by the need to maintain high surface area: as the ageing temperature increases, the ageing process leads to greater loss in surface area from the initial surface area.

The lowest suitable ageing temperature is determined by the desire to increase pore volume to a value of 1.5 cm$^3$/g or more.

The aging temperature required may be adjusted depending on the ageing time used: lower aging temperatures may be used for longer aging times and higher ageing temperatures for shorter ageing times.

The aqueous dispersion of silica gel in aqueous solution has a pH from 3 to 5, for instance from 3.5 to 4.5, and an ageing temperature from 40° C. up to the boiling point of the ageing solution, such as 45° C. to 100° C., with the highest and lowest suitable ageing temperature preferably as set out hereinbefore, for an ageing period of 4 hours or longer, such as from 4 to 30 hours, for instance from 4 to 20 hours in order to provide aged silica hydrogel particles. This contacting may be carried out in a closed vessel, or closed system, so that the aqueous ageing liquid and silica hydrogel are brought into contact and optionally agitated, stirred or recycled, with the amount and concentration of the aqueous solution being such as to provide the required pH of from 3 to 5. This is referred to in the art as "ageing". When ageing is carried out in this manner, typically 0.5 to 10 liters of aqueous ageing liquid will be required per kg of hydrogel.

Alternatively, the contacting may take place in an open system, when it is referred to in the art as "washing", so that an aqueous ageing solution of the required pH is passed over and through the silica hydrogel particles. Preferably, step d) is carried out as an ageing step.

The aqueous ageing solution having a pH from 3 to 5 will typically be water made acidic by addition of acid and/or buffering salts. Hence the aqueous ageing solution may consist essentially of water and mineral acid such as sulphuric acid. For instance, water acidified with sulphuric, nitric or hydrochloric acid may be used. A buffer system such as sodium carboxylate/carboxylic acid, e.g. sodium acetate/acetic acid or sodium citrate/citric acid may be employed. If step d) is carried out as an ageing step, as described hereinbefore, it is preferable to use a buffered system as the aqueous ageing solution so that pH may be maintained substantially constant throughout the ageing process. By substantially constant pH it is meant that the pH varies by less than +/−0.2 pH units over the ageing period.

The contacting step d) takes place over an ageing period and at a temperature from 40° C. up to the boiling point of the ageing solution, yielding aged silica hydrogel particles at the end of the step.

It will be evident from the descriptions of steps c) and d) as set out above, that it is within the scope of the invention for these steps to occur separately or for them to be combined into a single process step. If the washing of step c) is chosen to be carried out under suitable conditions that fall within the constraints of step d), then step d) will occur concurrently with step c). In other words, the acidified aqueous wash liquor of step c) may act as the aqueous ageing solution of step d).

Preferably, the aged hydrogel is acidified to a pH less than 3 after ageing in step d) and before solvent exchange in step e).

For instance, the aged hydrogel of step d) may be acidified to a pH from 1.5 to 3 prior to step e), after step d), particularly if the gel is to be stored or transported prior to further processing. The aged hydrogel gel is suitably acidified, by the addition of an acid such as sulphuric acid, to a pH of 1.5 to 3 (say 2) in order to ensure that unintended further ageing of the aged gel, on storage prior to solvent exchange, is reduced or eliminated. Such unintended ageing on storage may lead to unintended changes in pore volume or surface area.

Prior to step e), solvent exchange to remove water, there may be a further optional washing step using a further aqueous wash liquor acidified to a pH of 2.5 to 3.5, say 3 to 3.5 in order to wash out any soluble salts present, for instance in the event that a buffer system has been employed in step d) and in order to bring the gel pH to a value less than 3.5, for instance less than 3, prior to solvent exchange. It is desirable to ensure that the pH is 3.5 or less, preferably 3 or less for the aged gel during solvent exchange in order to reduce any unintended ageing which may lead to unintended changes in surface area and/or pore volume.

The aged hydrogel particles then undergo, in step e), solvent exchange with a liquid solvent having a surface tension of 35 mN/m or less, whereby the aqueous solution in the pore structure of the aged hydrogel particles is substantially replaced by the liquid solvent. Such solvent exchange processes are well known in the art and may involve multiple rinsing of the silica hydrogel whereby the water in the pore structure of the gel is eventually substantially entirely replaced by a solvent which is water-miscible, partially water-miscible or water-immiscible. For instance, water may be replaced by a water-immiscible solvent by first replacing it with a first solvent which is water-miscible and replacing this first solvent with a second solvent which is miscible with the first solvent but water-immiscible. By water-immiscible it is meant that the solvent has a solubility in water of less than 0.1% at 25° C.

This solvent exchange is followed by step f) in which the liquid solvent is substantially removed from the aged hydrogel particles to provide the catalyst support particles. The removal of the liquid solvent will typically be by evaporative drying, for instance in an oven, and may be carried out under reduced pressure, sometimes referred to as under vacuum, though it will be understood that the term refers to reducing the pressure over the gel particles whereby solvent removal is expedited. Alternatively, solvent removal may be effected by spray-drying a slurry of comminuted, solvent-exchanged particles. This typically will result in the formation of agglomerated particles comprising smaller particles of xerogel. The term "solvent exchange" as used in this specification is meant to refer to processes where a liquid solvent is used to replace water in the pore structure of a hydrogel and the solvent subsequently removed. The term may include the use of a solvent in a supercritical state at removal, but the process of the invention is preferably carried out using solvent exchange with a solvent that is a liquid, and not in a solid state nor in a supercritical state, during removal.

In other words, the solvent is preferably removed under a pressure of atmospheric pressure or less.

The ageing period is such that the resulting catalyst support particles have a pore structure with a pore volume of 1.5 cm$^3$/g or more and a surface area of 600 m$^2$/g or more. The most suitable ageing period may simply be determined by carrying out a series of trials to establish the ageing period required to give a desired pore volume and surface area for a particular temperature and pH of the aqueous solution used in the contacting step d). At low pH within the specified range, such as 3, higher temperatures and longer ageing times within the specified ranges are suitable. At higher pH such as 4 or 5, lower temperatures and shorter ageing times within the specified ranges may be used.

It will be seen from the experimental data set out hereinbelow that for an ageing period of 20 hours, within the pH range of 3 to 5, the resulting surface area after ageing, will depend upon the temperature at which ageing is carried out. At pH 5, to obtain a surface area in excess of 600 m$^2$/g, the ageing may be carried out at a temperature of about 71° C. or less, such as 70° C. or less, but to obtain higher surface areas, such as 800 m$^2$/g, the ageing temperature should be lower, say 55° C. or less. However, to obtain the required surface area at a pH of 3, the ageing may be carried out a temperature up to the boiling point of the ageing solution, but the temperature should suitably be in excess of about 60° C. in order to provide the required pore volume for the catalyst support particles.

Details of the suitable ageing temperatures and times for different pH values for the aqueous solution are set out in the examples hereinbelow in order to provide guidance as to how to put the subject matter of the invention into effect.

The ageing period is 4 hours or longer, such as from 4 to 30 hours, although longer ageing periods may be employed if desired.

The surface area, along with pore volume, is measured by nitrogen porosimetry using an Autosorb 6 analyzer (supplied by Quantachrome Corporation, Boynton Beach, Fla., USA). Samples are first outgassed at 350° C. for 4 hours on the instrument's outgassing station prior to measurement. The sample tube (containing the outgassed sample) is transferred to the analysis station, submerged in liquid nitrogen and a nitrogen isotherm determined. A surface area is calculated using BET theory taking data points in the P/Po range 0.05 to 0.30. A pore volume measurement is recorded at P/Po of 0.98 on the adsorption leg.

The silica xerogel may comprise at least 90% by weight of silica. Other oxides such as titanium or aluminium, or mixtures of such oxides, may be included in the atomic lattice structure of the silica xerogel, but these may also be absent. Suitably, silica xerogels used in the invention comprise at least 90% by weight of $SiO_2$, expressed as percentage by weight of the xerogel catalyst support particles. More preferably, the silica xerogels comprise at least 95% by weight of silica. $SiO_2$ level in the xerogel is suitably measured by elemental analysis using XRF (X-ray fluorescence spectroscopy) as detailed below.

In this specification, unless otherwise explained, percentages by weight refer to percentages as measured by elemental analysis using XRF. In other words, percentages are expressed in relation to the total material measured by XRF. The high temperatures used in sample preparation for XRF mean that any volatile materials such as water will have been lost prior to measurement and will not be included. Suitably, the silica xerogel of the catalyst support particles of the invention comprise less than 10% of oxides other than silica. For instance, the catalyst support particles are preferably a silica xerogel comprising at least 90% by weight of $SiO_2$.

The silica xerogel may consist or consist essentially of silica. The silica xerogel may also be a co-gel comprising one or more oxides selected from titanium oxide, aluminium oxide, zirconium oxide or mixtures thereof. For instance the silica xerogel may comprise from 0.01 to 9.9% by weight of such oxides in total. In other words, the total amount of oxides which are not silica is usually less than 10% by weight of the silica xerogel.

The catalyst support particles may suitably have a pore volume of 1.5 cm$^3$/g or more, 1.6 cm$^3$/g or more, 1.7 cm$^3$/g r more, 1.8 cm$^3$/g or more, 1.9 cm$^3$/g or more, 2.0 cm$^3$/g or more, 2.2 cm$^3$/g or more or 2.4 cm$^3$/g or more. The catalyst support particles may have a surface area of 600 m$^2$/g or more, 700 m$^2$/g or more 800 m$^2$/g or more, 900 m$^2$/g or more or even 950 m$^2$/g or more. For instance, the particles may have a pore volume of 1.8 cm$^3$/g with a surface area of 800 m$^2$/g or more, 900 m$^2$/g or more or even 950 m$^2$/g or more, or for instance the particles may have a surface area of 900 m$^2$/g with a pore volume of 1.7 cm$^3$/g or more, 1.8 cm$^3$/g, 1.9 cm$^3$/g or more, 2.0 cm$^3$/g or more, 2.2 cm$^3$/g or more or 2.4 cm$^3$/g or more.

The solvent used in the solvent exchange process of step e) suitably has a surface tension considerably lower than that of water, for instance 35 mNm$^{-1}$ or less, such as 30 mNm$^{-1}$ at 20° C.

Solvent exchange may be achieved by removing the water from a hydrogel by contacting with an excess of the solvent using a solvent which is water-miscible. This step may be repeated a number of times and then the exchanging solvent may be removed from the resulting solvent-exchanged gel, in step f), for instance by evaporation, to yield the pore structure in the catalyst support particles. Another solvent exchange process for removing water may involve a two-stage solvent exchange to replace water initially with a first water-miscible solvent followed by replacement of the first solvent with a second solvent that is miscible with the first solvent but immiscible or partially miscible with water. Another route for solvent removal is by azeotropic distillation with a partially water-miscible solvent. The partially water-miscible solvent, such as ethyl acetate, is added to the hydrogel and the mixture distilled. The solvent rich condensate is returned to the distilling mixture whilst the water rich distillate is discarded, leading to eventual replacement of the water in the hydrogel by the solvent. The resulting gel may then have the solvent removed by evaporation or other suitable means to form a xerogel.

The solvent used for solvent exchange may be a solvent such as methanol, ethanol, isopropyl alcohol, acetone, trifluoroacetic acid or some other suitable solvent. Ethyl acetate may be used as a solvent which is only partially miscible with water. More than one solvent may be used for solvent exchange, in mixtures or sequentially. Preferably, solvent exchange is not carried out with a supercritical solvent. Nor is the liquid solvent in a solid state during removal of the solid from the gel.

Without wishing to be bound by theory, it is thought that the lower surface tension of the solvent results in reduced capillary forces, compared to those arising for water, within the silica skeleton of the gel as the solvent is removed. This is thought to lead to a reduction in the amount of pore structure lost due to collapse of the silica skeleton during solvent removal. This enables the solvent to be in a liquid state as it is removed, avoiding the need for freeze-drying or use of supercritical conditions.

Although the solvent is substantially removed to form the xerogel, there may be some solvent remaining in the catalyst support particles of the invention. In particular, solvent may be present in a form chemically bonded to hydroxyl groups of the silica skeleton. This may lead to the catalyst support particles of the invention having a carbon content of from 0.05% to 3% by weight, for instance from 0.1% to 2% by weight. Preferably, excessive amounts of bonded hydroxyl groups are to be avoided as this may affect catalyst performance when the catalyst support is provided with a catalyst by impregnation and activation.

The carbon content may be suitably measured by the LECO CN-2000 Carbon Nitrogen Analyzer (supplied by LECO Corporation, St Joseph, Mich., USA). The analysis is carried out by combusting sample at high temperature (about 1350° C.) to convert any elemental carbon to $CO_2$. Prior to combustion, the samples are dried at 120° C. under a vacuum of 5.3 inch mercury (18 kPa) for 2 hours. The amount of $CO_2$ generated is measured by passing the generated gas through an infrared detector cell.

The second aspect of the invention provides a catalyst support particle which is a silica xerogel comprising at least 90% by weight of silica, having a pore volume of 1.5 cm³/g or more and a surface area of 600 m²/g or more, wherein the catalyst support particle provides a pH of 6 or less, typically from 3 to 6, such as from 3 to 5, when measured at 25° C. in a slurry of boiled, demineralised water with 12.5 g of catalyst support per 100 ml of slurry. The catalyst support particle may have a soda ($Na_2O$) content from 20 to 1000 ppm (parts per million) by weight, for instance from 60 to 600 ppm by weight. The sodium content of the catalyst support particles may suitably be measured by flame Atomic Absorption Spectroscopy (AA) using for instance a Perkin Elmer Model Analyst 100 Instrument. Samples for analysis are first digested in hydrofluoric acid and the solutions are aspirated into the AA spectrophotometer for Na analysis.

The soda content of catalyst support has an effect on the performance of the resulting activated catalyst and on the properties of the polymers formed using such catalyst. The catalyst activity and polymer MI have been found to increase with increasing soda content, and the polymer ESCR decreases with increasing soda content within the range from 20-1000 ppm $Na_2O$.

With regard to the pH of the catalyst support, the stability of the support surface area, particularly for supports with very high surface area, is dependent upon the pH of the support. For two support particles having the same surface area and stored under the same moisture/humidity conditions and same temperature, support particles with a higher pH will show a more rapid loss of surface area on storage. Hence, it is desirable for the support particles to exhibit a low pH, as measured herein, so that the desirable high surface area can be maintained during long-term storage of the support particles.

The catalyst support particle of the second aspect of the invention is suitably obtained by the process of the first aspect of the invention and preferred or suitable features of that aspect of the invention are also applicable, where appropriate, to this second aspect of the invention. Although the hydrogel is aged in the process of the invention at pH 3 to 5 and may be acidified to a pH of less than 3 and/or washed at a pH from 3 to 3.5, it has been found that the xerogel, following removal of water from the pore structure by solvent exchange, may have a pH up to 6.

The value of pH for the catalyst support particles is measured by taking 12.5 g of particles and adding boiled, demineralised water to the particles to provide a slurry having a volume of 100 ml (and hence a particle content of 12.5% weight/volume). The demineralised water should meet ISO 3696 (1987) grade 2 prior to boiling. The demineralised water is boiled to remove dissolved carbon dioxide, and then cooled to room temperature (25° C.) before use of the boiled, demineralised water for pH measurement. The slurry is stirred for 10 minutes or more until the pH reaches an equilibrium value. The pH of 6 or less for the particles is thought to arise as a result of the process step d) which involves long-term contact between the particles and an aqueous solution in the aqueous dispersion having a pH from 3 to 5. Optional acidification to pH 1.5-3.0 (say 2.0) after ageing but before solvent washing may also contribute to this reduced pH.

As set out above for the first aspect of the invention, the silica xerogel suitably comprises at least 90% by weight of silica. The catalyst support particles have a pore volume and surface area as set out hereinbefore for the catalyst support particles obtained by the process of the first aspect of the invention.

The catalyst support particles are suitably in the form of particles having a volume mean particle diameter from 1 to 300 micrometers. Typically the particles resulting from the process of the invention may be further comminuted and sieved whilst in the form of xerogel particles (i.e. after step f) in order to provide a volume mean particle diameter from 1 to 300 micrometers, as measured by light scattering, for the final xerogel support particles. The term diameter is used to refer to the particle size as measured by light scattering as set out hereinafter, though it is not meant to imply that the particles are spherical in shape. When the process of the invention involves spray-setting of sol particles or spray drying of solvent-exchanged particles to provide xerogel agglomerates, as set out hereinbefore, then the particle size may be adjusted using modification of spraying conditions combined with classification (e.g. by sieving). The volume mean particle diameter is also referred to as the volume moment mean of the particles, or $D[4,3] = \Sigma n_i d_i^4 / \Sigma n_i d_i^3$ summed over all particles i.

This typical mean diameter also applies to the catalyst precursor particles of the third aspect of the invention, and to the activated catalyst particles of the fifth aspect of the invention, which have essentially the same particle diameter as the support material. This may be suitably measured by particle size analysis by light scattering using an apparatus such as a Malvern™ Mastersizer. This instrument, made by Malvern Instruments, Malvern, Worcestershire, utilises Mie theory to calculate the particle size distribution. Mie theory predicts how light is scattered by spherical particles and takes into account the refractive index of the particles. The real value used for silica refractive index is 1.45 and 0.1 is used for the imaginary refractive index of the particle (corresponding to the absorption of light), with a water dispersant at 1.33 refractive index.

When considering the particle size distribution, as opposed to the mean particle size, the particles suitably have a $d_{90}$ of 500 μm or less, preferably 400 or less. They may have a $d_{50}$ of 300 μm or less. The particles may have $d_{10}$ of 1 μm or more, preferably 10 or more. (For the sake of clarity, $d_{90}$ is the diameter at which 90% by volume of the particles have a diameter less than $d_{90}$—equivalent definitions apply to $d_{50}$ and $d_{10}$). Preferably, the particles have a $d_{50}$ from 1 to 300 μm, more preferably from 5 to 250 μm, even more preferably from 25 to 150 μm.

The particles may be prepared by comminution, optionally combined with size classification, by means such as sieving.

A third aspect of the invention provides a catalyst precursor comprising a catalyst support particle according to the second aspect of the invention, or a catalyst precursor obtained or obtainable by the first aspect of the invention, comprising a compound of a catalyst metal deposited within the pore structure.

By "catalyst precursor" is meant a product, which is suitable for handling and transporting to a site where it can be activated in order to be used as a catalyst, particularly as an olefin polymerisation catalyst. Generally, such catalysts are activated, by means of heating in a non-reducing, preferably an oxidising, atmosphere as described hereinbelow, shortly before use. Hence the catalyst precursor is a commercially useful material, which can be used to form catalysts simply by activation or calcination.

Preferably, the catalyst metal is or comprises chromium, but may be, or include, other metals or their mixtures, such as aluminium, titanium, zirconium, vanadium, boron or the like. Known processes may be used for impregnating a compound containing catalyst metal into the pore structure of the catalyst support particles, for instance using deposition from solution using aqueous or preferably non-aqueous solvents. Either salts or organometallic compounds may be used to effect deposition, preferably in a manner such that the deposition does not substantially diminish the pore volume of the pore structure of the catalyst support particles, for instance whereby the pore volume of the catalyst precursor is at least 70% of that of the catalyst support particle, such as at least 80% or at least 90%.

The process of GB 1 575 352 A allows for the simultaneous impregnation of a porous inorganic carrier material with both chromium and aluminium compounds. The method disclosed requires that organometallic chromium and aluminium compounds are dissolved in an aliphatic and/or cycloaliphatic carrier solvent, contacted with the catalyst support particles and then the carrier solvent is removed by evaporation, leaving the organometallic chromium and aluminium compounds deposited inside the pore structure of the particles.

WO 99/12978 discloses catalysts prepared by a process comprising a first stage during which catalyst support particles are impregnated with a solvent carrying a chromium compound and a second, optional stage during which the product from the first stage is impregnated with either a titanium or an aluminium compound. The chromium compound is a chromium oxide or a compound, which can be converted to chromium oxide by calcining, such as chromium nitrate, sulphate, carbonate, acetate, acetylacetonate, ammonium chromate or tert-butyl chromate. The aluminium compounds mentioned are acetyl acetate, acetylacetonate, alkoxy or alkyl types.

U.S. Pat. No. 4,814,308 discloses a catalyst support particles laden with chromium, phosphorus and aluminium, each in oxide form, used in combination with a co-catalyst. The supported catalyst is formed by means of impregnating the porous support particles using chromium and aluminium organometallic compounds in an organic solvent.

WO 2009/053672 discloses a method for loading the pore structure of catalyst support particles with chromium and aluminium as well as boron using aqueous or lower aliphatic alcohol solutions and non-organometallic salts. These methods, and other methods known in the prior art, may be used for loading compounds containing catalyst metal into the pore structure of the catalyst support particles of the invention.

The catalyst precursor of the third aspect of the invention suitably comprises, as carried material, typically deposited in the pore structure, although some material may be carried on outer surfaces of the catalyst support particles, from 0.01 to 3% by weight of chromium, if present, expressed as the element, preferably from 0.1 to 2%, more preferably from 0.25 to 1.5%. The catalyst precursor suitably comprises, as carried material, from 0.1 to 8% of aluminium, if present, expressed as the element, preferably from 0.2 to 4%, more preferably from 0.5 to 2.5%. The catalyst precursor suitably comprises, as carried material, 0.1 to 8% of titanium expressed as the element, if present, preferably from 0.2 to 5%, more preferably from 0.5 to 4%. Mixtures of the metals may be used, or only one of the metals may be present. The levels of chromium, titanium and/or aluminium are suitably measured by means of XRF (X-ray fluorescence) using for instance a PANalytical™PW2440 Magix Pro Instrument as supplied by PANalytical BV, Almedo, the Netherlands. Samples for analysis are first calcined at 1000° C. in air for 1 hour and prepared as fused beads using a lithium borate flux. Fusion is typically between 1000° C. and 1250° C.

The amounts of catalyst metal present as carried material (i.e. typically deposited on the surfaces of the catalyst precursor, particularly surfaces within the pore structure) are determined by comparison with the measured levels in the inorganic support material prior to impregnation to form the catalyst precursor. The levels present as carried material are obtained by subtraction of any contribution from materials already within the structure of the inorganic support material.

A fourth aspect of the invention provides an olefin polymerisation catalyst obtained by heating a catalyst precursor according to the third aspect of the invention, in a non-reducing atmosphere, preferably an oxidizing atmosphere at a temperature from 200 to 1200° C., preferably from 400 to 1000° C. for an activation period from 30 minutes to 15 hours.

Preferably, the non-reducing atmosphere is an oxidizing atmosphere, such as an oxygen-containing atmosphere such as air or oxygen or mixtures thereof.

This process is known as activation or calcination of the catalyst precursor in order to form the active olefin polymerisation catalyst. Activation may proceed initially in a non-reducing atmosphere free of oxygen followed by activation in an atmosphere comprising oxygen, or vice versa. Any suitable activation process may be employed.

Typically, the activated olefin polymerisation catalyst comprises levels of catalyst metal, as carried material, similar to the preferred levels detailed above for the catalyst precursor. The levels of chromium, aluminium and titanium are suitably measured by means of XRF as detailed above. The amount of catalyst metal present as carried material on the catalyst support particles are obtained by subtraction of the measured amounts already in the catalyst support particles prior to impregnation to form a catalyst precursor.

A fifth aspect of the invention provides a method for polymerisation of one or more $C_2$ to $C_8$ α-alkenes characterized in that the polymerisation is carried out in the presence of an olefin polymerisation catalyst according to the fourth aspect of the invention.

A sixth aspect of the invention provides the use of an olefin polymerisation catalyst according to the fourth aspect of the invention for polymerisation of one or more $C_2$ to $C_8$ α-alkenes to generate low melt index polymers. In particular, the olefin polymerisation catalyst is used for generation of low melt index polymers, such as polymers having a High Load Melt Index (HLMI) of 15 g/10 min or less, more preferably 10 g/10 min or less. The HLMI may be greater than 1 g/10 min.

Mixtures of alkenes or alkenes in combination with other monomers may be employed. The use of the catalysts prepared using the methods of the invention and from the catalyst precursors of the invention is not particularly restricted to alkene polymerisation, but it is particularly suitable for that purpose. Co-catalysts may be used in combination with the catalysts prepared from the precursors of the invention or by the method of the invention. Typically, after activation, the catalyst is cooled to ambient temperature (say 15 to 35° C.) and stored ready for use in polymerization. The catalyst prepared using invention may be used in a variety of homo- or co-polymerisation routes, for instance for the production of polyethylenes, by process routes such as solution, slurry-loop, solution CSTR (continuous flow stirred tank) or gas phase polymerisation.

It has been found that olefin polymerisation carried out according to the fifth or sixth aspects of the invention results in the measured catalyst activity and NCTL/ESCR behaviour for the polymer produced being higher, for a required Melt Index (MI) and density targets for the polymer produced, than for prior art catalyst support particles with surface areas less than 600 m$^2$/g and/or pore volume less than 1.5 cm$^3$/g. MI is roughly a measure of the polymer molecular weight, with a high MI corresponding to a low molecular weight for the polymer. For catalysts with the same pore volume but differing surface areas, the catalyst with the higher surface area will have smaller pore diameters and consequently is suitable for making low MI polymers (i.e. polymers of high molecular weight). The catalyst of high surface area may be activated at a relatively high temperature yet still achieve the required low MI target. Activation at a high temperature gives good catalyst activity.

For the same catalyst, polymer of the same MI (and same density) produced from a catalyst activated at a higher temperature will typically have poorer NCTL/ESCR characteristics than if the catalyst were activated at a lower temperature (and a higher polymerisation reaction temperature must typically be employed). For the same catalyst PV and the same activation temperature, polymer of the same MI and density produced from a catalyst with high surface area (which requires a higher polymerisation reaction temperature) has improved NCTL/ESCR behaviour than if a lower surface area catalyst were used.

Taking these trends into consideration, a catalyst particle with a high surface area for a particular pore volume will allow for a higher activation temperature to be used to achieve a specific MI target, giving better catalyst activity, whilst also maintaining or improving the polymer NCTL/ESCR characteristics, compared to a polymer produced using a catalyst particle with a lower surface area but the same pore volume.

Polymer activity is the weight of polymer generated per weight of catalyst used per hour. Without wishing to be bound by theory, it is thought that the improved catalytic activity may arise as a consequence of the higher surface area of the pore structure in the catalyst support particles.

Also, when the activated catalysts are used to catalyse polymerisation, polymerisation at active sites within the catalysts tends to lead to fragmentation of the support particles. This fragmentation of the catalyst particles during polymerisation is an important and advantageous feature as it means that catalyst particles do not have to be removed from the polymer—they may remain as a "filler" in the polymer. However, if large, un-fragmented catalyst particles remain in the polymer, these can lead to defect formation in articles subsequently formed from the polymer. The invention provides catalyst particles which fragment easily during polymerisation, reducing or eliminating downstream process defects.

The invention will now be described further by reference to the following, non-limiting Examples.

EXAMPLES

TABLE 1

Figure 1:
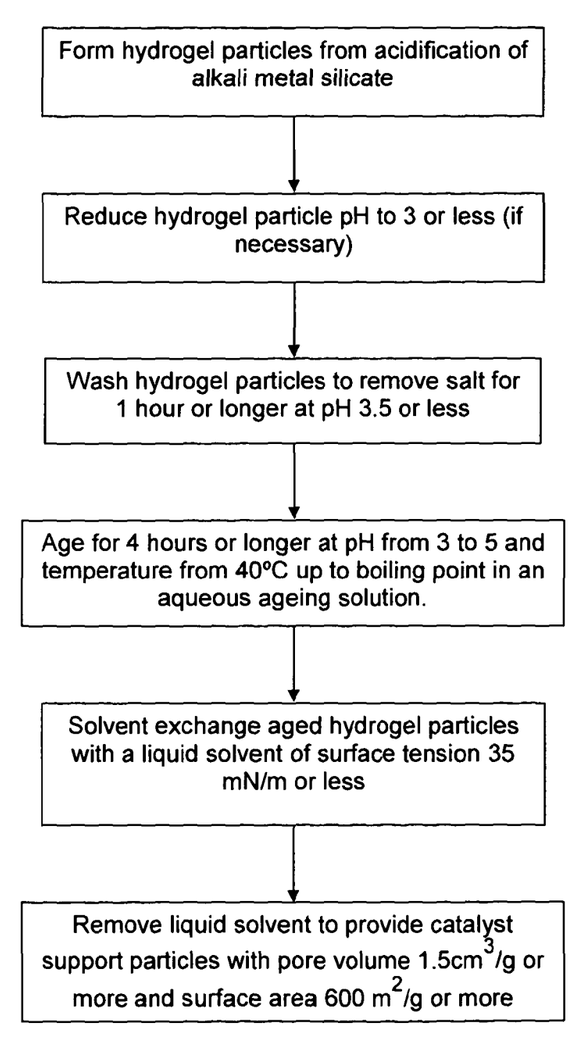
FIG. 1 shows a schematic flow chart representing the process steps of the first aspect of the invention.

| Hydrogel $SiO_2$ % by weight | Ageing condition | | | Xerogel properties | | |
|---|---|---|---|---|---|---|
| | pH start of ageing | pH end of ageing | Ageing T (° C.) | SA ($m^2/g$) | PV ($cm^3/g$) | $Na_2O$ (ppm) |
| 25% | No ageing | | | 927 | 0.69 | — |
| | 4.1 | 4.1 | 65 | 904 | 2.51 | — |
| | 5.0 | 5.0 | 65 | 677 | 2.64 | — |
| | 5.0 | 5.0 | 55 | 808 | 2.61 | 569 |
| | 5.0 | 5.0 | 45 | 928 | 2.45 | — |
| | 4.0 | 4.0 | 65 | 933 | 2.25 | — |

TABLE 1-continued

| Hydrogel $SiO_2$ % by weight | Ageing condition | | | Xerogel properties | | |
|---|---|---|---|---|---|---|
| | pH start of ageing | pH end of ageing | Ageing T (° C.) | SA ($m^2/g$) | PV ($cm^3/g$) | $Na_2O$ (ppm) |
| 27% | No aging | | | 1036 | 0.91 | — |
| | 2.9 | 3.0 | 47 | 1046 | 1.18 | — |
| | 3.0 | 3.0 | 58 | 1054 | 1.50 | 92 |
| | 3.0 | 3.0 | 78 | 996 | 2.20 | — |
| | 3.0 | 3.0 | 91 | 900 | 2.40 | — |

For the Examples in Table 1, formation of hydrosol was by mixing sodium silicate (24.5% $SiO_2$ having $SiO_2$:$Na_2O$ molar ratio of 3.22) with sulphuric acid and water under high shear with a molar ratio of 1.4 for $H_2SO_4$:$Na_2O$. The target hydrosol solids content was about 16% by weight of $SiO_2$. The hydrosol gelled in about 7 minutes and was allowed to mature for 70 minutes prior to crushing. The crushed hydrogel was washed with water acidified to pH 3.3 with sulphuric acid in order to remove $Na_2SO_4$ arising as a by-product of gel formation, and also to remove excess sulphuric acid. The value for silica by weight in the table is for the washed hydrogel, with soluble salts that are the by-products of the sol-gel formation substantially removed from the pore structure of the hydrogel.

Portions of the washed hydrogel were subsequently aged using the conditions set out in Table 1. The aqueous ageing solution was buffered using citric acid/sodium citrate. The ageing time used in each case was 20 hours. After ageing, the gel pH was adjusted to pH 2 by acidification. The gels were later washed with water acidified to pH 3.3, prior to solvent exchange.

Solvent exchange was carried out using methanol as the exchange solvent. Repeated washes with methanol were carried out until the residual water was 1% by weight or less. The methanol-exchanged gels were then dried to form xerogels by evaporation of methanol.

TABLE 2

| Ageing conditions | | | | | |
|---|---|---|---|---|---|
| pH initial | pH final | time (hours) | SA ($m^2/g$) | PV ($cm^3/g$) | $Na_2O$ (ppm) |
| No ageing | | 0 | 1096 | 1.16 | |
| 4.0 | 4.0 | 4 | 1072 | 1.71 | |
| 4.0 | 4.0 | 8 | 1033 | 2.18 | |
| 4.0 | 4.0 | 12 | 983 | 2.24 | |
| 4.0 | 4.0 | 16 | 951 | 2.32 | |
| 4.0 | 4.0 | 20 | 940 | 2.43 | |
| 4.0 | 4.0 | 24 | 915 | 2.44 | 104 |

For the Examples shown in Table 2, the hydrogel was prepared as set out above for the Examples set out in Table 1, but with varying ageing times and a fixed ageing temperature of 65° C. For these Examples in Table 2, the buffer used was sodium citrate/citric acid.

TABLE 3

| Ageing condition | | Solvent | | Gel properties | |
|---|---|---|---|---|---|
| pH initial | pH final | Type | Surface tension (mN/m) | SA (m²/g) | PV (cm³/g) |
| 4 | 4 | Water | 72.8 | 834 | 0.74 |
| 4 | 4 | Methanol | 22.6 | 872 | 1.97 |
| 4 | 4 | Isopropanol | 21.8 | 864 | 1.98 |
| 4 | 4 | Trifluoroacetic acid | 13.6 | 869 | 3.80 |

For the Examples shown in Table 3, the hydrogel was prepared as set out above for the Examples set out in Table 1, but with a $SiO_2$ content of 15% for the hydrogel. The ageing time was 24 hours and the ageing temperature was 65° C. For these Examples in Table 3, the buffer used was again sodium citrate/citric acid.

The invention claimed is:

1. A process for preparation of catalyst support particles having a pore structure with a pore volume of 1.5 cm³/g or more and a surface area of 600 m²/g or more, the process comprising:
   a) providing a silica hydrogel having a solids content from 15% to 33% by weight by acidification of an alkali metal silicate,
   b) forming the silica hydrogel into hydrogel particles,
   c) washing the hydrogel particles, at a pH of 3.5 or less to substantially remove salt, optionally for a period of 1 hour or longer,
   d) contacting the hydrogel particles with an aqueous ageing solution, arranged to provide an aqueous dispersion having a pH from 3 to 5, and at an ageing temperature from 40° C. up to the boiling point of the solution, for an ageing period of 4 hours or longer, to provide aged hydrogel particles, wherein the ageing temperature is from a lowest ageing temperature $T_L$ to a highest ageing temperature $T_H$, wherein $T_L=(90-10\times pH)°$ C. and $T_H=(184-22.6\times pH)°$ C.,
   e) carrying out solvent exchange on the aged hydrogel particles with a liquid solvent having a surface tension of 35 mN/m or less whereby the aqueous solution in the aged hydrogel particles is substantially replaced by the liquid solvent, and
   f) substantially removing the liquid solvent from the aged hydrogel particles to provide the catalyst support particles having a pore structure with a pore volume of 1.5 cm³/g or more and a surface area of 600 m²/g or more.

2. The process of claim 1 wherein the ageing period is from 4 to 30 hours.

3. The process of claim 1 wherein the ageing period is from 4 to 20 hours.

4. The process of claim 1 wherein the aged hydrogel of step d) is acidified to a pH less than 3 after ageing in step d) and before solvent exchange in step e).

5. The process of claim 1 wherein the aqueous ageing solution comprises a buffer arranged to provide the aqueous dispersion with a substantially constant pH from 3 to 5 whilst contacting the hydrogel particles to provide aged hydrogel particles.

6. The process of claim 5 wherein the buffer is a sodium carboxylate/carboxylic acid buffer.

7. The process of claim 1 wherein the solvent is removed under a pressure of atmospheric pressure or less.

8. The process of claim 1 wherein the hydrogel particles prior to ageing have a surface area measurable on the washed hydrogel, after drying at 150° C., of 920 m²/g or more.

9. The process of claim 1 wherein the hydrogel particles prior to ageing have a pore volume measurable on the washed hydrogel, after solvent exchange, of 1.3 cm³/g or less.

10. The process of claim 1 wherein the catalyst support particles are silica xerogel particles comprising at least 90% by weight of silica.

11. The process of claim 1 wherein the catalyst support particles have a pore volume of 1.8 cm³/g or more.

12. The process of claim 1 wherein the catalyst support particles have a surface area of 800 m²/g or more.

13. A catalyst support particle which is a silica xerogel comprising at least 90% by weight of silica, having a pore volume of 1.5 cm³/g or more and a surface area of 800 m²/g or more, wherein the catalyst support particle provides a pH of 3-5 when measured at 25° C. in a slurry of boiled, demineralised water with 12.5 g of catalyst support per 100 ml of slurry, and wherein the catalyst support particle has a soda content from 20 to 1000 ppm by weight.

14. The catalyst support particle of claim 13, wherein the catalyst support particle is obtained by the process of:
   a) providing a silica hydrogel having a solids content from 15% to 33% by weight by acidification of an alkali metal silicate,
   b) forming the silica hydrogel into hydrogel particles,
   c) washing the hydrogel particles, at a pH of 3.5 or less to substantially remove salt, optionally for a period of 1 hour or longer,
   d) contacting the hydrogel particles with an aqueous ageing solution, arranged to provide an aqueous dispersion having a pH from 3 to 5, and at an ageing temperature from 40° C. up to the boiling point of the solution, for an ageing period of 4 hours or longer, to provide aged hydrogel particles, wherein the ageing temperature is from a lowest ageing temperature $T_L$ to a highest ageing temperature $T_H$, wherein $T_L=(90-10 \times pH)°$ C. and $T_H=(184-22.6 \times pH)°$ C.,
   e) carrying out solvent exchange on the aged hydrogel particles with a liquid solvent having a surface tension of 35 mN/m or less whereby the aqueous solution in the aged hydrogel particles is substantially replaced by the liquid solvent, and
   f) substantially removing the liquid solvent from the aged hydrogel particles to provide the catalyst support particles having a pore structure with a pore volume of 1.5 cm³/g or more and a surface area of 800 m²/g or more.

15. The catalyst support particle of claim 13 wherein the catalyst support particle has a pore volume of 1.8 cm³/g or more.

16. A catalyst precursor comprising a catalyst support particle according to claim 13 and a compound of a catalyst metal deposited within the pore structure of the catalyst support particle.

17. An olefin polymerisation catalyst obtained or obtainable by heating a catalyst precursor according to claim 16 in a non-reducing atmosphere at a temperature from 200 to 1200° C. for an activation period from 30 minutes to 15 hours.

18. A method for polymerisation of one or more $C_2$ to $C_8$ α-alkenes characterized in that the polymerisation is carried out in the presence of an olefin polymerisation catalyst according to claim 17.

19. The method of claim 18 for polymerisation of one or more $C_2$ to $C_8$ α-alkenes into low melt index polymers.

20. The catalyst precursor according to claim 16 wherein the catalyst metal comprises chromium.

* * * * *